May 22, 1951  G. B. CLARK  2,553,632
AIRCRAFT ARRESTING GEAR WITH RELEASABLE HOOK
Filed Sept. 18, 1947
FIG. 1
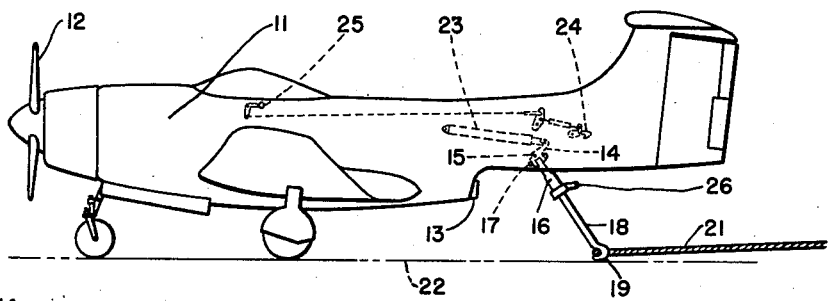
FIG. 2
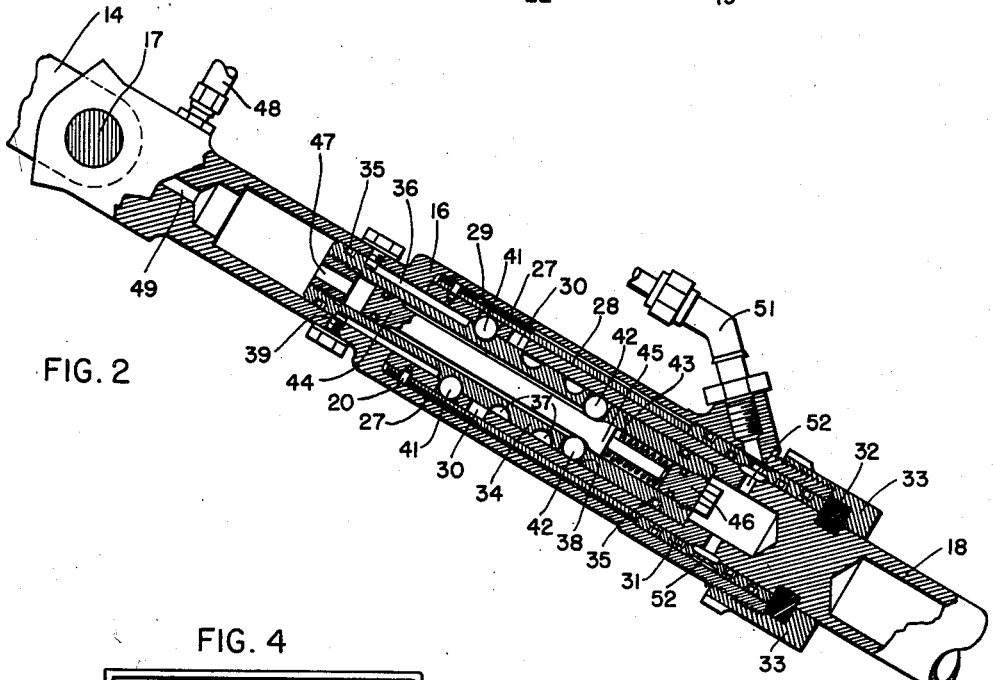
FIG. 4
FIG. 3
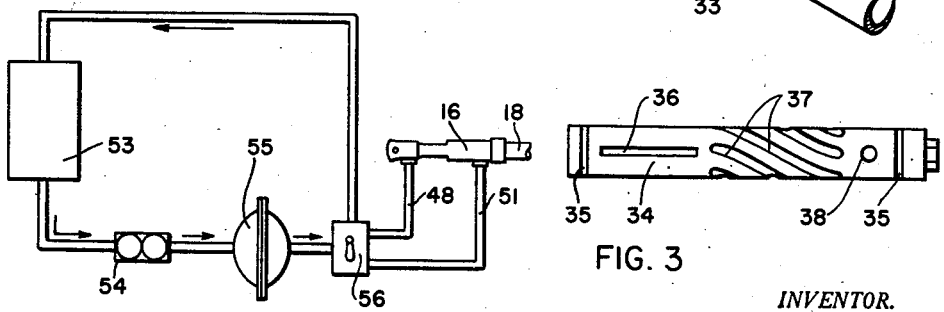
INVENTOR.
GERARDUS B. CLARK
BY
*Richard W. Treverton*
ATTORNEY Patented May 22, 1951

2,553,632

UNITED STATES PATENT OFFICE 2,553,632

AIRCRAFT ARRESTING GEAR WITH RELEASABLE HOOK

Gerardus B. Clark, Paeonian Springs, Va., assignor to Curtiss-Wright Corporation, a corporation of Delaware Application September 18, 1947, Serial No. 774,784

9 Claims. (Cl. 244—110)

1

The present invention relates to arresting gear for aircraft, and particularly to an improved arresting hook and operating means therefor whereby the aircraft pilot may release the hook from engagement with the cooperating arresting means adjacent the landing surface subsequent to the arresting operation.

Arresting hooks heretofore employed to enable aircraft to land on short landing surfaces have usually been released or disengaged manually from the arresting cable, or from such other means as may be arranged adjacent the landing surface for cooperation with the hook in arresting the forward motion of a landing aircraft. Such manual release of the hook usually has been accomplished by a member of the crew employed to move or aid in moving the airplane from the landing area. However with the advent of aircraft powered with jet propulsion engines, as distinguished from propeller driven aircraft, such manual release of the hook is not practicable because of the jet or jets of hot gasses issuing from the jet engine or engines in proximity to the hook.

Heretofore certain aircraft have been provided with a releasable arresting gear including a hook formation having articulated sections adapted to be opened to effect release, but structural difficulties have rendered such hooks unsuitable for present day military aircraft which are relatively heavy and have high landing speeds.

According to the present invention means are provided to rotate the arresting hook substantially about the axis of its shank and out of engaged relation with the cooperating arresting cable or equivalent device. The rotating means are provided in and as a part of the shank of the hook, and hence do not interfere with the normal articulated connection between the aircraft and the arresting gear. The rotating means also do not interfere with the latch means which are provided to normally hold the hook, when not in use, retracted within the aircraft. Furthermore the rotating means of the present invention enable the use of a unitary hook or claw formation, avoiding the structural difficulties which have attended hook formations consisting of articulated sections.

The foregoing and other objects and advantages will become apparent from the following description of the typical embodiment of the invention shown in the accompanying drawings, wherein:

Figure 1 is a side elevational view of an airplane with the arresting gear thereof in operative engaged relation with an arresting element adjacent a landing surface;

Figure 2 is a fragmentary longitudinal sectional view through the arresting gear, with the hook rotating mechanism in the position thereof wherein the hook is released;

Figure 3 is an elevational view of the plunger of the hook rotating mechanism; and, Figure 4 is a diagrammatic view of a simplified hydraulic system for actuating the hook rotating mechanism.

As shown in Figure 1 the airplane 11 may include an engine driven propeller 12 and also a jet propulsion system, such as a turbo-jet engine having a tail pipe 13 through which hot gasses exhaust rearwardly from the airplane. Mounted on the rear portion of the airplane fuselage is an arresting gear comprising a fitting 14 pivoted about a substantially horizonal axis 15 to the aircraft, a hook body portion 16 pivoted at 17 to fitting 14, and a hook proper comprising a shank 18 which extends into body portion 16 and a claw 19.

In the extended and operative position of the arresting gear shown in Figure 1 the claw is adapted to engage a cable 21 or other arresting element provided adjacent the landing surface 22 to arrest the forward motion of the airplane, as will be well understood by those skilled in the art. The arresting gear may include a dash-pot or snubbing device 23 pivoted between the aircraft and fitting 14 to prevent the hook from bouncing out of the path of the element 21 when it strikes the surface 22 during a landing operation.

The arresting gear may also include a latch mechanism 24 releasable by a lever 25 in the pilot's compartment of the aircraft, the latch mechanism being engageable with a latch detent 26 on body portion 16 of the hook. The latch mechanism normally holds the hook retracted in the airplane fuselage. Upon release of the latch by the pilot's operation of handle 25, the hook will drop by gravity, swinging about pivot 15 to the position shown in Figure 1 in which the claw 19 is disposed to grasp the element 21 as the airplane lands or as it rolls on its landing run. The pivot pin 17, whose axis is in a substantially vertical plane, allows lateral motion of the hook, thereby providing needed flexibility in the connection between the hook and the airplane structure.

Secured to shank 18 of the hook by pins 20 is a journal sleeve 27 bearing upon the inner cylindrical wall of body 16, the pins also securing to the shank a sleeve 28 which functions to close openings 29 and 30 formed in the shank, for a purpose hereinafter described, and to hold against axial displacement a bearing sleeve 31 provided between the shank and body 16. As indicated in Figure 2 sleeve 31 is provided with grooves containing suitable fluid seals. The shank is also provided with a split ring 32 which constitutes a shoulder engageable by a cap 33 that is screw threaded upon body 16 to hold the shank against axial displacement.

Slidable in axially aligned cylinder chambers that are formed in the shank 18 and body 16 is a plunger unit shown in elevation in Figure 3. This unit comprises a tubular body 34 having circumferential grooves 35 for packing rings, longitudinal guide grooves 36, spiral grooves 37 and openings 38. Guide pins 39 screw threaded to body 16 engage in grooves 36 to hold the plunger against rotation relative to body 16, while balls 41 seating in spiral grooves 37 of the plunger and openings 29 of shank 18 cause the latter to rotate when the plunger is moved axially.

Within the openings 38 are balls 42 for locking the hook in its operative position, the position in which it appears in Figure 1. The balls 42 are moved outwardly from the position shown in Figure 2 to also engage in openings 30 to effect such locking when the hook is rotated in the proper position, i. e. when the plunger is at the opposite end of its stroke from the position shown in Figure 2. The outward movement of balls 42 is effected by a spring 43 which urges axial movement (to the left in Figure 2) of a small plunger 44 which operates within the plunger body 34. This small plunger 44 has a stem provided with a cam formation 45 adapted to engage and move the balls 42 outwardly into openings 30 upon axial movement urged by spring 43. The end of plunger body 34 adjacent spring 43 is closed by plug 46 while the opposite end thereof is restricted by a threaded sleeve 47 to confine the small plunger 44.

Means are provided to direct fluid pressure against either end of the plunger unit for rotating the hook element 18, 19. These means may include a flexible fluid conduit 48 communicating through passage 49 with the cylinder chamber within body 16 and another flexible fluid conduit 51, communicating with the cylinder chamber within the shank 18 through passages 52 formed in bearing 31 and the shank 18.

Various means may be provided to supply fluid pressure through conduits 48 and 51. One system, shown diagrammatically in Figure 4 by way of example, includes a fluid reservoir 53, pump 54, pressure accumulator 55 and reversing valve 56, the control for the latter preferably being in the pilot's compartment of the air plane. With this system valve 56 may be operated to a first position to direct fluid under pressure from the accumulator and conduit 51 to body 16, with return fluid passing from body 16 through conduit 48 to the reservoir. Or the valve 56 may be operated to a second position to direct fluid under pressure from the accumulator through conduit 48 to body 16, with return fluid passing through conduit 51 to the reservoir.

In the first position of the valve, fluid entering body 16 through conduit 51 and passages 52 will move the plunger body 34 to the left as the parts appear in Figure 2. During this movement the balls 41 acting in spiral grooves 34 will cause the hook element 18, 19 to rotate approximately one-half turn in a counterclockwise direction as viewed from the back of the airplane, to bring the claw 19 to the position indicated in Figure 1 wherein it may engage an arresting element 21. At the limit of this movement the openings 38 will be substantially aligned with openings 30, so that spring 43 may shift small plunger 44 to the left within plunger body 34, moving the balls 42 outwardly into locked position. By this locking action the claw 19 is positively retained in operative position even though the hydraulic pressure applied through conduit 51 should fail.

When the valve 56 is operated to its second position to supply fluid pressure to body 16 through conduit 48, the entering fluid will first act upon plunger 44, shifting it to the right in Figure 2 against the compression of spring 43 and thereby allowing balls 42 to recede from openings 30. Thereupon fluid pressure on the plunger unit, including the plunger 44 and body 34 will shift the unit to the right, with the result that the hook element 18, 19 will be rotated one-half revolution, freeing the claw 19 from engagement with an arresting element 21 should such element be engaged therewith.

It will thus be understood that the pilot, by operating valve 56, may release the arresting hook from the element 19 subsequent to an arrested landing, thereby eliminating any need for a ground crewman to enter into the region aft of the tail pipe 13 from which hot gasses may be issuing. In fact, if desired, the pilot, having released the hook, may taxi the airplane along the surface 22 without the assistance of another person.

The invention enables the shank 18 and claw 19 of the hook to be made of one rigid unit. It also enables full freedom of action of the articulated connection of the hook to the body, as provided by pivots 15 and 17, so that it retains the primary advantage of arresting gear that has heretofore been used successfully and combines therewith the added advantage of a remotely actuated hook release.

It will be understood further that the embodiment of the invention illustrated and particularly described herein is merely illustrative of one preferred embodiment of the inventive principles involved, and that these principles may be otherwise embodied without departing from the spirit of my invention or from the scope of the appended claims.

I claim as my invention:

1. Means for arresting forward motion of an aircraft, comprising a hook having a shank articulated to the aircraft for movement about a transverse axis and adapted to extend downwardly and rearwardly from the aircraft, and said hook having at the aft end of said shank a forwardly directed claw arranged to act during such forward motion to hook onto an arresting element disposed adjacent a landing surface and extending substantially transversely of the line of said forward motion, and means for rotating said claw substantially about the longitudinal axis of said shank to release the hook from the arresting element.

2. Means for arresting forward motion of an aircraft, comprising a body articulated to the aircraft for movement about a transverse axis, a hook having a shank journalled for rotation about its axis within said body, said hook extending downwardly and rearwardly from the aircraft and having at the aft end of said shank a forwardly directed claw arranged to act during such forward motion to hook onto an arresting element disposed adjacent a landing surface and extending substantially transversely of the line of said forward motion, power operated means reacting between the shank and body for partially rotating said claw substantially about the axis of said shank to release the hook from the arresting element, and remote control means for said power operated means.

3. In combination with an aircraft, a forward motion arresting gear for engaging an arresting device disposed adjacent to a landing surface and extending substantially transversely of the line of said forward motion; said gear comprising a member pivoted about a first axis substantially transverse of the aircraft, a body member pivoted to said member about a second axis disposed in a vertical plane longitudinal of the aircraft, a hook comprising a shank extending downwardly and rearwardly from said body and having at the lower and aft end thereof a claw formation for engagement with a said arresting device and at the opposite end being mounted for rotation within said body substantially about a third axis extending substantially lengthwise of said shank; snubbing means connected between the aircraft and said member; latch means effective between the aircraft and said body for releasably holding the arresting gear in raised position; power operated means in said body for rotating the hook about said third axis to disengage the claw formation thereof from a said arresting device with which it may be engaged; and means in said aircraft for operating said power operated means.

4. In combination with an aircraft, a forward motion arresting gear for engaging an arresting device disposed adjacent to a landing surface and extending substantially transversely of the line of said forward motion; said gear comprising a member pivoted about a first axis substantially transverse of the aircraft, a body member pivoted to said member about a second axis disposed in a vertical plane longitudinal of the aircraft, a hook comprising a shank extending downwardly and rearwardly from said body and having at the lower and aft end thereof a claw formation for engagement with a said arresting device and at the opposite end being mounted for rotation within said body substantially about a third axis extending substantially lengthwise of said shank; power operated means in said body for rotating the hook about said third axis to disengage the claw formation thereof from a said arresting device with which it may be engaged; and means in said aircraft for controlling said power operated means.

5. In combination with an aircraft, an arresting gear for engaging an arresting device disposed adjacent to a landing surface; said gear comprising a member pivoted about a first axis substantially transverse of the aircraft, a body member pivoted to said member about a second axis disposed in a vertical plane longitudinal of the aircraft, a hook comprising a shank having at one end thereof a claw formation for engagement with a said arresting device and at the opposite end being mounted for rotation within said body substantially about a third axis extending substantially lengthwise of said shank; snubbing means connected between the aircraft and said member; latch means effective between the aircraft and said body for releasably holding the arresting gear in raised position; power operated means in said body for rotating the hook about said third axis to disengage the claw formation thereof from a said arresting device with which it may be engaged, said power operated means comprising a plunger movable longitudinally within said body, means for converting longitudinal movement of the plunger into rotational movement of the hook; and means for operating and controlling said power operated means comprising a source of fluid pressure in said aircraft, flexible conduits connecting said source of fluid pressure to said body adjacent the opposite ends of said plunger, and valve means in said aircraft for selectively connecting said flexible conduits to said source of fluid pressure.

6. In combination with an aircraft, an arresting gear for engaging an arresting device disposed adjacent to a landing surface; said gear comprising a member pivoted about a first axis substantially transverse of the aircraft, a body member pivoted to said member about a second axis disposed in a vertical plane longitudinal of the aircraft, a hook comprising a shank having at one end thereof a claw formation for engagement with a said arresting device and at the opposite end being mounted for rotation within said body substantially about a third axis extending substantially lengthwise of said shank; power operated means in said body for rotating the hook about said third axis to disengage the claw formation thereof from a said arresting device with which it may be engaged, said power operated means comprising a plunger movable longitudinally within said body, means for converting longitudinal movement of the plunger into rotational movement of the hook; and means for operating and controlling said power operated means comprising a source of fluid pressure in said aircraft, flexible conduits connecting said source of fluid pressure to said body adjacent the opposite ends of said plunger, and valve means in said aircraft for selectively connecting said flexible conduits to said source of fluid pressure.

7. An arresting gear comprising a body provided with means for articulated connection to an aircraft, a hook having a shank with a claw formation at one end thereof, the opposite end of the shank being journalled for rotation within the body substantially about the longitudinal axis of the shank, said shank and body having an axially extending cylinder chamber therein, a plunger movable longitudinally in the cylinder chamber, means for applying differential fluid pressures to said chamber at the opposite ends of the plunger for moving the latter longitudinally, means for converting longitudinal movement of the plunger into rotation of the hook, and means for locking the plunger in one position thereof in the absence of fluid pressure thereon.

8. An arresting gear comprising a body provided with means for articulated connection to an aircraft, a hook having a shank with a claw formation at one end thereof, the opposite end of the shank being journalled for rotation within the body substantially about the longitudinal axis of the shank, said shank and body having an axially extending cylinder chamber therein, a plunger movable longitudinally in the cylinder chamber, means for applying differential fluid pressures to said chamber at the opposite ends of the plunger for moving the latter longitudinally, and means for converting longitudinal movement of the plunger into rotation of the hook.

9. An arresting gear comprising a body provided with means for articulated connection to an aircraft, a hook having a shank with a claw formation at one end thereof, the opposite end of the shank being journalled for rotation within the body substantially about the longitudinal axis of the shank, said shank and body having an axially extending cylinder chamber therein, and power operated means in said chamber for rotating the hook relative to said body.

GERARDUS B. CLARK.

REFERENCES CITED

The following references are of record in the file of this patent:

UNITED STATES PATENTS

| Number | Name | Date |
|---|---|---|
| 1,085,000 | Amiss | Jan. 20, 1914 |
| 1,955,740 | Dzus | Apr. 24, 1934 |
| 2,079,491 | Cooke | May 4, 1937 |
| 2,225,790 | Nardone | Dec. 24, 1940 |
| 2,419,438 | Clark | Apr. 22, 1947 |
| 2,421,739 | Albright | June 10, 1947 |
| 2,428,684 | Sanborn | Oct. 7, 1947 |